(12) United States Patent
Banerjee et al.

(10) Patent No.: US 7,349,078 B2
(45) Date of Patent: Mar. 25, 2008

(54) CHARACTERIZATION OF LENSES

(75) Inventors: Partha P. Banerjee, Dayton, OH (US);
Yasser A. Abdelaziez, Dayton, OH (US)

(73) Assignee: University of Dayton, Dayton, OH (US)

( * ) Notice: Subject to any disclaimer, the term of this patent is extended or adjusted under 35 U.S.C. 154(b) by 75 days.

(21) Appl. No.: 11/414,628

(22) Filed: Apr. 28, 2006

(65) Prior Publication Data

US 2006/0262292 A1 Nov. 23, 2006

Related U.S. Application Data

(60) Provisional application No. 60/676,499, filed on Apr. 29, 2005.

(51) Int. Cl.
*G01B 9/00* (2006.01)
(52) U.S. Cl. ............... 356/125; 356/124.5; 356/124
(58) Field of Classification Search ........ 356/124–127; 250/461.1
See application file for complete search history.

(56) References Cited

U.S. PATENT DOCUMENTS

| | | | | |
|---|---|---|---|---|
| 3,768,910 A | * | 10/1973 | Zanoni | 356/624 |
| 3,880,525 A | * | 4/1975 | Johnson | 356/127 |
| 5,355,210 A | * | 10/1994 | Keren et al. | 356/124 |
| 5,805,276 A | * | 9/1998 | Davis et al. | 356/124 |
| 5,864,402 A | * | 1/1999 | Stenton | 356/515 |

OTHER PUBLICATIONS

P.P. Banerjee, R.M. Misra AndM. Magharoui, "Theoretical and experimental studies of propagation of beams through a finite sample of a cubically nonlinear material", J. Opt. Soc. Amer, B vol. 8 pp. 1072-1080 (1991)—USA.

P.P. Banerjee and R.M. Misra, "Propagation of profiled optical beams through Kerr media", Microwave and Optics Technology Letters vol. 4 pp. 471-475 (1991)—USA.

(Continued)

*Primary Examiner*—Sang H. Nguyen
(74) *Attorney, Agent, or Firm*—Dinsmore & Shohl LLP

(57) ABSTRACT

In accordance with one embodiment of the present invention, a method of characterizing a lens is provided. According to the method, an optical source such as a laser is configured to generate a collimated beam that is focused along an optical axis at a distance $f_{ext}$. A test lens is placed along the optical axis, wherein the test lens is characterized by an effective focal length $f_i$ that is substantially independent of incident irradiance. An output beam generated from the focused optical source and the test lens defines an output intensity profile at an observation plane located a distance $Z_0$ from the focal point of the optical source. The on-axis intensity I of the output intensity profile along the optical axis at the observation plane is monitored as the placement of the test lens along the optical axis is varied. A z-scan signature of the test lens is generated from the monitored intensity I. The z-scan signature is a plot of intensity as a function of $\Delta z$, where $\Delta z$ represents a distance between a position of the test lens and the focal point $f_0$ along the optical axis. The effective focal length $f_i$ of the test lens is characterized by determining the slope $m_0$ of the z-scan signature at $\Delta z = 0$. Additional embodiments are disclosed and claimed.

15 Claims, 3 Drawing Sheets

OTHER PUBLICATIONS

P.P. Banerjee, A.Y. Danileiko, T. Hudson and D. McMillen, "P-scan analysis of inhomogeneously induced optical nonlinearities", J. Opt. Soc. Amer. B, vol. 15 pp. 2446-2454 (1998)—USA.

L. Pea and P.P. Banerjee, "Measurement and analysis of optical nonlinearities of nematic liquid crystals", Proc. SPIE vol. 4467 pp. 281-287 (2001)—USA.

M. Noginov, S.W. Helzer, G.B. Loutts, P.P. Banerjee, M. Morrisey, Y. Kim, "Study of photorefraction response and diffraction efficiency in Mn:YAlO$_3$ crystals", J. Opt. Soc. Amer. B, vol. 20 pp. 1233-1241 (2003)—USA.

Xian-Chu Peng, Tao Jia, Jian-Ping Ding, Jing-Liang He, Hui-Tian Wang, "Determinations of third- and fifth- order nonlinearities by the use of the top-hat-beam Z scan: theory and experiment" J. Opt. Soc. Am. B/vol. 22, No. 2/Feb. 2005—USA.

M. Sheik-Bahae, A.A. Said, E.W. Van Stryland, "High-sensitivity, single-beam $n_2$ measurements," Optics Letter Sep. 1, 1989/vol. 14, No. 17—USA.

\* cited by examiner

CHARACTERIZATION OF LENSES

CROSS-REFERENCE TO RELATED APPLICATIONS

This application claims the benefit of U.S. Provisional Application Ser. No. 60/676,499 (UVD 0343 MA), filed Apr. 29, 2005.

BRIEF SUMMARY OF THE INVENTION

The present invention relates to the characterization of lenses and, more particularly, to a scheme for characterizing the effective focal length, phase profile, and aberration parameters of a lens or lens array. The methods of the present invention are applicable for any lens or lens array, whether it is an adaptive, variable focal length lens or a fixed focal length lens. In addition, it is contemplated that the present invention is applicable for short and long focal length lenses. However, it is particularly well suited for short focal length, adaptive lenses and adaptive electro-optic lenses, because these lenses are typically difficult to characterize.

In accordance with one embodiment of the present invention, a method of characterizing a lens is provided. According to the method, an optical source such as a laser is configured to generate a collimated beam which is then focused along an optical axis at a distance $f_{ext}$. A test lens is placed along the optical axis, wherein the test lens is characterized by an effective focal length $f_i$ that is substantially independent of incident irradiance. An output beam generated from the focused optical source and the test lens defines an output intensity profile at an observation plane located a distance $Z_0$ from the focal point $f_0$ of the optical source. The on-axis intensity I of the output intensity profile along the optical axis at the observation plane is monitored as the placement of the test lens along the optical axis is varied. A z-scan signature of the test lens is generated from the monitored intensity I. The z-scan signature is a plot of intensity as a function of $\Delta z$, where $\Delta z$ represents a distance between a position of the test lens and the focal point $f_0$ along the optical axis. The focal length $f_i$ of the test lens can be characterized by determining the slope $$m_0 = \frac{f_{ext}^2}{w_0^2 z_0^2 f_i}$$

of the z-scan signature at $\Delta z = 0$, derived using ray optics.

In accordance with another embodiment of the present invention, the focal length $f_i$ of the test lens is characterized by determining a position of the irradiance peak of the z-scan signature along $\Delta z$.

In accordance with another embodiment of the present invention, the test lens is characterized using the following formula:

$$I(0, 0, Z_0) = f(\Delta z)\left(1 + \exp\frac{-k_0 r_0^2 b}{|q_z|^2} - 2\exp\frac{-k_0 r_0^2 b}{2|q_z|^2}\cos\frac{-k_0 r_0^2 a}{2|q_z|^2}\right),$$

where $I(0,0,Z_0)$ corresponds to the on-axis intensity and $$f(\Delta z) = \frac{k_0^2}{4\pi^2 Z_0^2 f_i^2} \frac{|q_0|^2}{|q_0|^2 + (\Delta z)^2}|q_z|^2,$$

a,b are the real and imaginary parts of the complex quantity $q_z$, defined as $$\frac{1}{q_z} = \frac{1}{q_0 + \Delta z} + \frac{1}{Z_0} - \frac{1}{f_i}, q_0 = jk_0 w_0^2/2 = j\frac{4 f_{ext}^2}{k_0 W_0^2}, j = \sqrt{-1},$$

and $k_0 = 2\pi/\lambda$, where $\lambda$ is the wavelength of the light source. This formula also incorporates the finite aperture size of the test lens $2r_0$ and is derived using rigorous wave optics.

Accordingly, it is an object of the present invention to provide for improved characterization of lenses. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
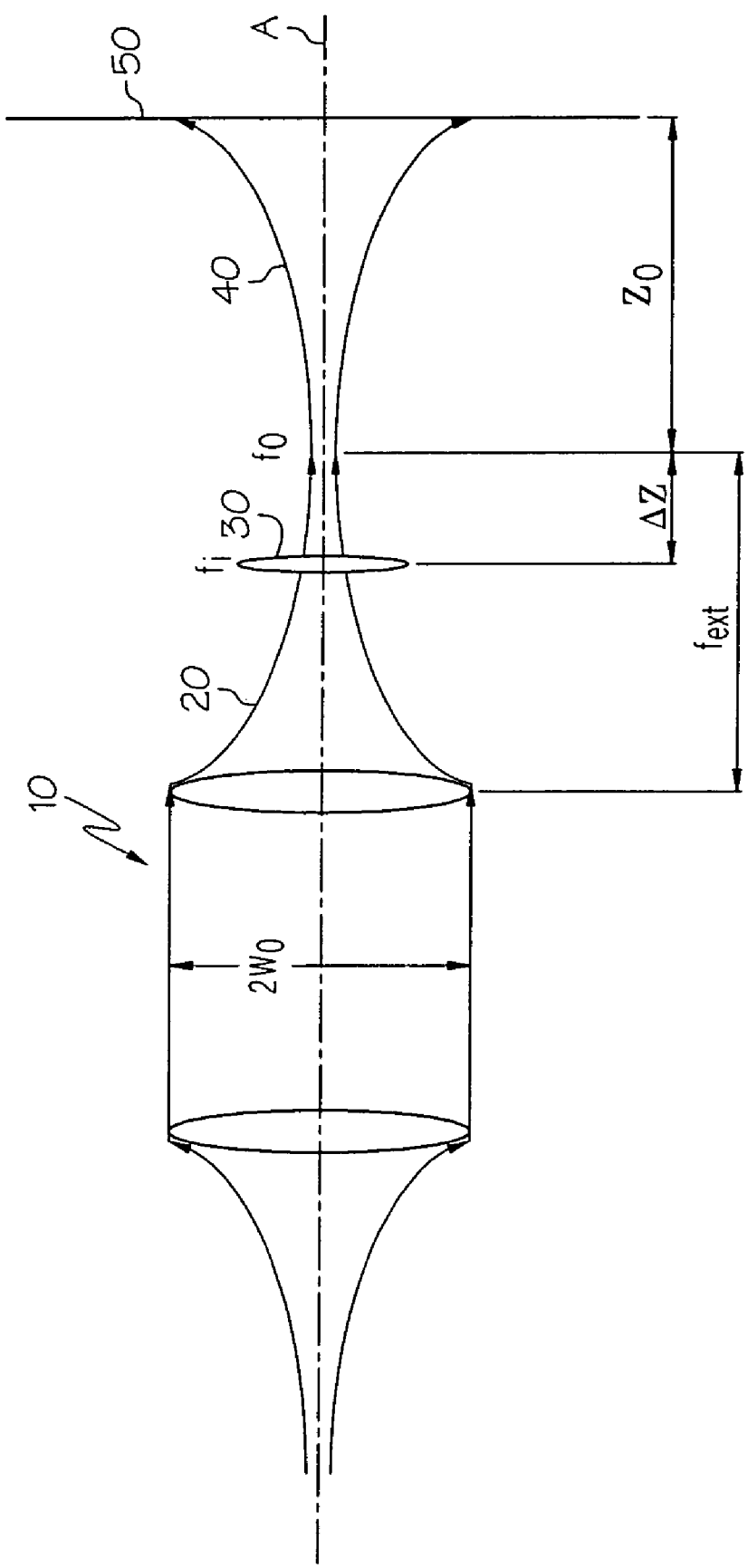
FIG. 1 is a schematic illustration of a method of characterizing a lens according to the present invention.

A method of characterizing a lens according to one embodiment of the present invention can be described with reference to FIG. 1, where an optical source 10, a converging laser beam 20, and a test lens 30 are illustrated.

The optical source 10 includes a laser source (not shown) and lens elements arranged to generate a collimated optical beam that converges as a focused laser beam 20 along an optical axis A at a distance $f_{ext}$ behind a focusing lens of the optical source 10. The test lens 30 is also placed along the optical axis A and may be characterized in terms of an unknown focal length $f_i$. The test lens 30 is typically not a non-linear optical element and, as such, its focal length is independent of incident irradiance, i.e., the focal length will not vary to a significant extent as the intensity of the incident laser beam varies. The focal length $f_{ext}$ is illustrated in FIG. 1 as extending from the converging lens of the optical source 10 to the focal point $f_0$. However, it is noted that the focal length $f_{ext}$ will not correspond to the distance between the converging lens and the focal point $f_0$ where the beam incident upon the converging lens is not collimated.

An output beam 40 generated from the optical source 10 and the test lens 30 defines an output intensity profile at an observation plane 50 located a distance $Z_0$ from the focal point $f_0$. According to the methodology of one embodiment of the present invention, the intensity I of the output beam 40 along the optical axis A at the observation plane 50 is monitored as the placement of the test lens along the optical axis is varied and a z-scan signature of the test lens 30 is generated from the monitored intensity I.

Figure 2:
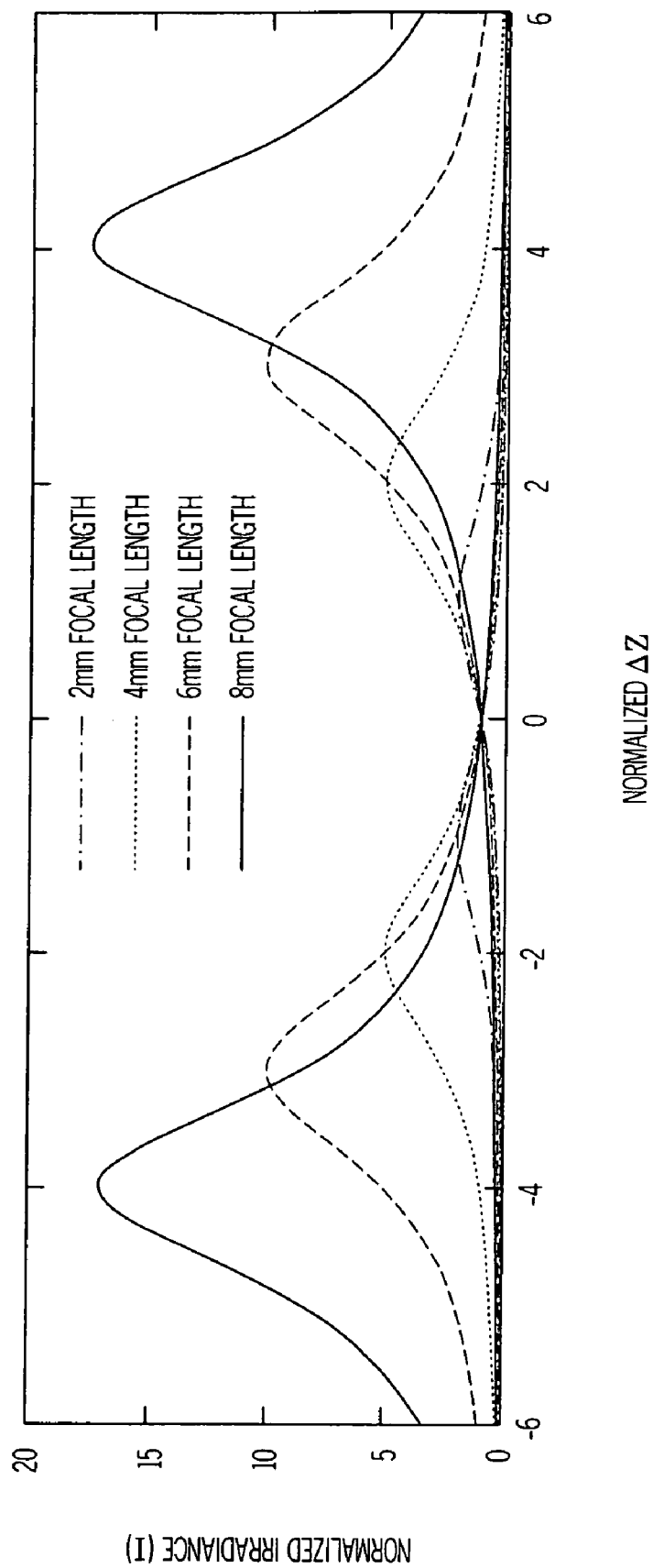
FIG. 2 is a graph illustrating a two-dimensional z-scan signatures according to the present invention.

A z-scan signature, examples of which are illustrated in FIG. 2, is a plot of intensity I as a function of $\Delta z$, where $\Delta z$ represents a distance between a position of the test lens and the focal point $f_0$ along the optical axis A. The focal length $f_i$ of the test lens 30 may be characterized by determining the slope $m_0$ of the z-scan signature at $\Delta z=0$. The focal length $f_i$ of the test lens can be characterized on the premise that it is proportional to the slope at $\Delta z=0$. More specifically, the slope $m_0$ is used to characterize the focal length $f_i$ of the test lens as follows:

$$m_0 = \frac{f_{ext}^2}{w_0^2 z_0^2 f_i}$$

where $f_{ext}$ is the focal length of the optical source, $W_0$ is one-half the initial width of the collimated laser beam 10, and $Z_0$ is a distance along the optical axis A from the focal point $f_0$ to the observation plane 50.

The sign of the slope $m_0$, i.e., positive or negative slope, can be used to characterize the test lens 30 as a positive or negative lens. More specifically, a positive slope at $\Delta z=0$ can be correlated with a positive focal length $f_i$ and a negative slope at $\Delta z=0$ can be correlated with a negative focal length $f_i$.

Figure 3:
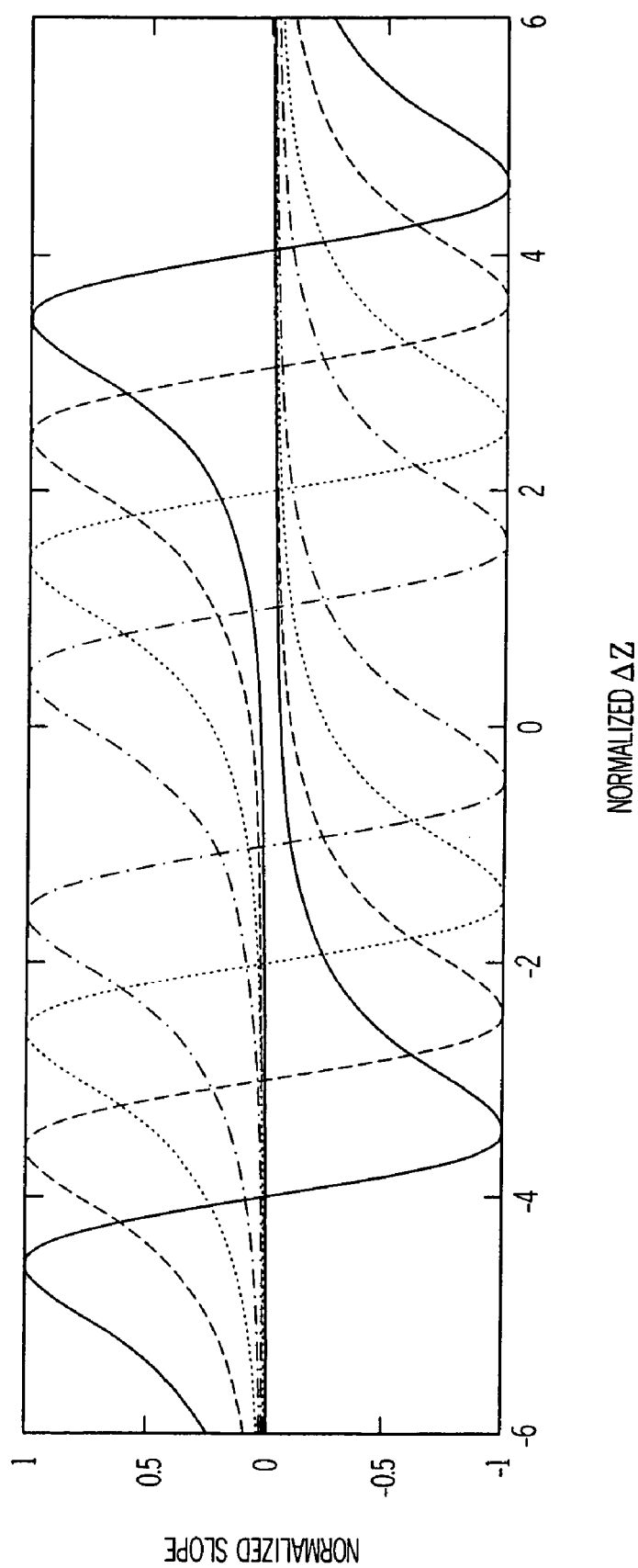
FIG. 3 is a graph illustrating slope values associated with the z-scan signatures of FIG. 2.

In FIG. 2, respective z-scan signatures for eight different lenses are illustrated, i.e., 2 mm, 4 mm, 6 mm, and 8 mm positive and negative focal length lenses. The signatures with intensity peaks on the negative portion of the $\Delta z$ axis correspond to negative focal length lenses while the intensity peaks on the positive portion of the $\Delta z$ axis correspond to positive focal length lenses. FIG. 3 illustrates slope values associated with the respective z-scan signatures of FIG. 2, where the negative focal length lenses are characterized by a negative slope at $\Delta z=0$ and the positive focal length lenses are characterized by a positive slope at $\Delta z=0$. As is illustrated in FIGS. 2 and 3, longer focal length lenses are characterized by smaller slopes at $\Delta z=0$.

According to one aspect of the present invention, the collimated beam of the optical source 10 is configured such that the converging laser beam 20 approximates a converging Gaussian intensity profile. Typically, collimation is achieved using a laser source and a collimating lens. The collimated beam of the optical source 10 can be configured to generate a converging laser beam 20 defined by a beam waist $2w_0$ that is either greater or less than the aperture $2r_0$ of the test lens 30. Beyond these points, the particular configuration of the optical source 10 is not the subject of the present invention and those practicing the present invention are directed to other resources for more specific instructions regarding suitable optical source design.

According to one embodiment of the present invention, the test lens 30 comprises a microlens array and the collimated beam of the optical source 10 is configured to generate a converging Gaussian laser beam 20 defined by a beam width that may be greater than the respective apertures of the lens elements within the array over the scan length $\Delta z$. It is contemplated that the test lens may comprise a fixed focal length lens or a variable focal length lens comprising, for example, an electrooptic element. In the case of the variable focal length lens, the z-scan signature can additionally be generated as a function of voltage applied to the lens to generate a three-dimensional z-scan signature comprising dimensions $\Delta z$, intensity, and applied voltage. In addition, it is contemplated that the on-axis intensity I can be monitored as the placement of the test lens 30 along the optical axis A is varied between points on opposite sides of the focal point $f_0$ or on a common side of the focal point $f_0$.

It is contemplated that particular sources of error in determining the focal length $f_i$ of the test lens 30 may be remedied, at least in part, by ensuring that the observation plane 50 is positioned well beyond the focal point $f_0$. Under particular circumstances, it may be preferable to position the observation plane sufficiently beyond the focal point $f_0$ to approximate an infinitely displaced observation plane, where far-field approximations in wave optics can be used.

Another embodiment of the present invention contemplates characterization of the focal length $f_i$ of the test lens 30 by identifying an irradiance peak in the z-scan signature and determining the position of the irradiance peak along $\Delta z$. Specifically, referring to the graph of FIG. 2, each of the z-scan signatures illustrated therein include an irradiance peak that is displaced to the right or left of $\Delta z=0$. According to the contemplated method, the focal length $f_i$ of the test lens 30 is presumed to be proportional to the value of $\Delta z$ corresponding to the irradiance peak. A positive value of $\Delta z$ at the irradiance peak corresponds to a positive focal length $f_i$ and a negative value of $\Delta z$ at the irradiance peak corresponds to a negative focal length $f_i$.

Referring further to FIG. 2, it is noted that longer focal length determinations are prone to decreased accuracy when utilizing the irradiance peak of the z-scan to characterize the focal length $f_i$ of the test lens 30. It is contemplated that it may be preferable to set the observation plane 50 at almost infinity and subtract the value of $\Delta z$ corresponding to the irradiance peak from the observation distance to address this source of error. This shift in the position of the observation plane 50 will shift the value of $\Delta z$ corresponding to the irradiance peak to a slightly larger value, accounting for a significant portion of the calculation error.

Another embodiment of the present invention contemplates characterization of the test lens 30 by using the following formula:

$$I(0, 0, Z_0) = f(\Delta z)\left(1 + \exp\frac{-k_0 r_0^2 b}{|q_z|^2} - 2\exp\frac{-k_0 r_0^2 b}{2|q_z|^2}\cos\frac{k_0 r_0^2 a}{2|q_z|^2}\right),$$

where $I(0,0,Z_0)$ corresponds to the on-axis intensity and $$f(\Delta z) = \frac{k_0^2}{4\pi^2 Z_0^2 f^2}\frac{|q_0|^2}{|q_0|^2 + (\Delta z)^2}|q_z|^2,$$

a,b are the real and imaginary parts of the complex quantity $q_z$, defined as $$\frac{1}{q_z} = \frac{1}{q_0 + \Delta z} + \frac{1}{Z_0} - \frac{1}{f_i}, \; q_0 = jk_0 w_0^2/2 = j\frac{4 f_{ext}^2}{k_0 W_0^2}, \; j = \sqrt{-1},$$

and $k_0 = 2\pi/\lambda$, where $\lambda$ is the wavelength of the light source. This formula also incorporates the finite aperture size of the test lens $2r_0$ and is derived using rigorous wave optics.

More specifically, referring to FIG. 1, the optical field of a Gaussian beam propagating in the Z-axis in the q-formalism has the general form of $$E(x, y, z) = E_0 \frac{q_0}{q(z)} \exp-j\frac{(x^2+y^2)}{2q(z)} \exp(-jk_0 z)$$

with the beam width at a distance z, w(z), expressed as $$w^2(z) = w_0^2 \left(1 + \left(\frac{z}{z_R}\right)^2\right)$$

and its radius of curvature R(z) as $$R(z) = z\left(1 + \left(\frac{z_R}{z}\right)^2\right)$$

where $w_0$ is the minimum beam width or waist at $f_{ext}$, and $z_R$ is the Raleigh length. The parameter $z_0$ is given by $z_R = k_0 w_0^2/2$, and $k_0$ is the wave number given by $k_0 = 2\pi/\lambda$, where $\lambda$ is the wavelength of the light source.

The test lens 30 with focal length $f_i$ and aperture size of radius $r_0$, is placed around the focal point of a converging Gaussian beam, where the beam has a plane wavefront. In the two steps test, first the lenslet will be scanned for $\pm \Delta z$ distance about the focal point. The scanned $\Delta z$ range will be chosen to be a multiple of the Raleigh length, and such that the beam width at w(z) at a distance $\Delta z$ is smaller than the lens aperture $r_0$. For a scanning distance $\Delta z = n z_R$, where n is an integer, we have $w(z) \approx n w_0$.

For example, for an original beam diameter at the focal point $w_0 = 10$ μm, the minimum lens aperture that can be used if we would like to scan for $\Delta z = 5 z_R$ will be 50 μm. By plotting the on-axis intensity versus the scanned distance $\Delta z$, we can infer the focal length of the micro-lens. In a variation of the test, the beam size may be larger than the size of the lenslet over the scan distance $\Delta z$. A diffraction pattern due to the presence of the aperture will form. By changing the applied voltage the diffraction pattern shape will change. The focal length can be inferred from the peak and size of the inner lobe while the diffraction pattern in general can produce information about the wave front aberration due to the finite aperture size of the lenslet.

The Gaussian optical field distribution a distance $\Delta z$ before the lens under test is $$E(x, y) = \frac{q_0}{q_0 + \Delta z} \exp\left(-\frac{j(x^2+y^2)k_0}{2(q_0 + \Delta z)}\right)$$

where $q_o$ is the q-parameter $(=jk_o w_o^2/2)$ at the waist of the beam $w_0$ at $f_{ext}$.

Using the expression for E(x,y) above and the Fresnel Diffraction formula, one can express the optical field distribution on the observation plane 50 in FIG. 1, taking into consideration the lens aperture, as $$E(x, y, Z_0) = \frac{jk_0}{2\pi Z_0} \int\int T(x', y') \times \exp-\frac{jk_0}{2Z_0}((x-x')^2 + (y-y')^2) dx' dy'$$

where $T(x',y') = E(x',y') \times p_f(x',y') \times T_f(x',y')$, and where it is assumed that $\Delta z \ll Z_0$.

The preceding equation has 3-terms: (a) the Gaussian field distribution E(x,y); (b) the aperture function $p_f(x,y) = \text{circ}(r/r_0) = 1$ for $r < r_0$, 0 otherwise; and (c) the lens phase function $$T_f(x', y') = \exp\frac{j(x^2+y^2)k_0}{2f_i}.$$

After simple algebra, we have $$E(x, y, Z_0) = C \int\int p_f(x', y') \exp\frac{-jk_0}{2Z_0}(xx' + yy') \exp\frac{-jk_0}{2q_z}(x'^2 + y'^2) dx' dy'$$

where $$C = \frac{jk_0}{2\pi Z_0} \times \frac{q_0}{q_0 + \Delta z} \exp\frac{-jk_0}{2Z_0}(x^2 + y^2) \text{ and } \frac{1}{q_z} = \frac{1}{q_0 + \Delta z} + \frac{1}{Z_0} - \frac{1}{f}.$$

The above-noted expression for $E(x,y,Z_0)$ can be solved numerically to provide the diffraction pattern at approximately a distance $Z_0$ from the lens under test. Such a diffraction pattern will be a function of the lens aperture and the applied voltage, since the lens focal length varies with the applied voltage. The diffracted light intensity is $I(x,y,Z_0) \propto |E(x,y,Z_0)|^2$.

It is contemplated that the test lens 30 may be further characterized by adding an aberration term to the formula for $I(0,0,Z_0)$ and extracting aberration coefficients. Similarly, it is contemplated that the test lens 30 can be characterized by obtaining the focal length or the phase profile from the formula for $I(0,0,Z_0)$. Where the phase profile is obtained, the lens may be characterized by comparing the phase profile of the test lens 30 with the ideal quadratic profile of the test lens 30 to determine lens aberration.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of characterizing a lens, said method comprising:
   generating a laser beam;
   converging the laser beam along an optical axis at a distance $f_{ext}$ and corresponding focal point $f_0$;
   placing a test lens along said optical axis, wherein said test lens is characterized by an effective focal length $f_i$ that is substantially independent of incident irradiance;
   generating an output beam from said laser beam using said test lens, said output beam comprising an observable output intensity profile at an observation plane located a distance $Z_0$ from the focal point $f_0$;
   varying placement of said test lens along said optical axis;
   monitoring on-axis intensity I of said observable output intensity profile of said output beam along said optical axis at said observation plane as the placement of said test lens along said optical axis is varied;
   plotting a z-scan signature of said test lens using said monitored intensity I, where said z-scan signature is a plot of intensity as a function of $\Delta Z$, where $\Delta Z$ represents a distance between a position of said test lens and said focal point $f_0$ along said optical axis; and
   characterizing the focal length $f_i$ of said test lens by determining a slope $m_0$ of said plotted z-scan signature at $\Delta Z=0$.

2. A method of characterizing a lens as claimed in claim 1 wherein said focal length $f_i$ of said test lens is characterized by calculating said focal length $f_i$ as being proportional to a value of said slope at $\Delta z=0$.

3. A method of characterizing a lens as claimed in claim 1 wherein said focal length $f_i$ of said test lens is characterized by correlating a positive slope at $\Delta z=0$ with a positive focal length $f_i$ and a negative slope at $\Delta z=0$ with a negative focal length $f_i$.

4. A method of characterizing a lens as claimed in claim 1 wherein said focal length $f_i$ of said test lens is characterized by determining a value and sign of said slope at $\Delta z=0$.

5. A method of characterizing a lens as claimed in claim 1 wherein said slope $m_0$ is used to characterize said focal length $f_i$ of said test lens as follows:

$$m_0 = \frac{f_{ext}^2}{w_0^2 z_0 f_i}$$

where $f_{ext}$ is the focal length defined by said optical source, $W_0$ is one-half the initial width of said converging laser beam generated by said optical source, and $Z_0$ is a distance along said optical axis from the focal point $f_0$ to the observation plane.

6. A method of characterizing a lens as claimed in claim 1 wherein said converging laser beam approximates a Gaussian intensity profile.

7. A method of characterizing a lens as claimed in claim 1 wherein said optical beam comprises a collimated beam from a laser source and at least one external lens positioned along said optical axis.

8. A method of characterizing a lens as claimed in claim 1 wherein said test lens has a characteristic lens aperture and said optical beam width is either greater than or less than said characteristic lens aperture.

9. A method of characterizing a lens as claimed in claim 1 wherein:
   said test lens comprises a microlens array;
   respective elements of said microlens array have defined characteristic lens apertures; and
   said optical beam width is either greater than or less than said characteristic lens apertures.

10. A method of characterizing a lens as claimed in claim 1 wherein said test lens comprises a variable focal length electrooptic lens.

11. A method of characterizing a lens as claimed in claim 10 wherein said z-scan signature is generated as a function of voltage applied to said electrooptic lens to generate a three-dimensional z-scan signature comprising dimensions $\Delta z$, intensity, and applied voltage.

12. A method of characterizing a lens as claimed in claim 1 wherein said test lens comprises a microlens array.

13. A method of characterizing a lens as claimed in claim 1 wherein said observation plane is positioned beyond said focal point $f_0$.

14. A method of characterizing a lens as claimed in claim 13 wherein said observation plane is positioned sufficiently beyond said focal point $f_0$ to approximate an infinitely displaced observation plane.

15. A method of characterizing a lens as claimed in claim 1 wherein said on-axis intensity is monitored as said placement of said test lens along said optical axis is varied between points on opposite sides of said focal point or on a common side of said focal point.

* * * * *